No. 863,055. PATENTED AUG. 13, 1907.
G. DIEHL.
BAND WHEEL REGULATOR.
APPLICATION FILED SEPT. 8, 1905. RENEWED JUNE 10, 1907.
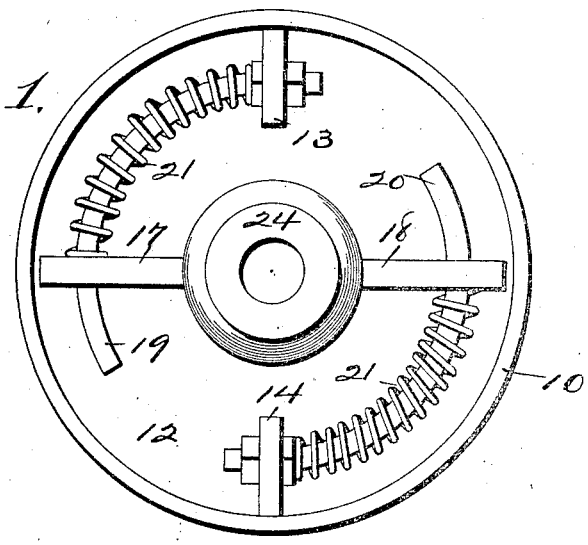
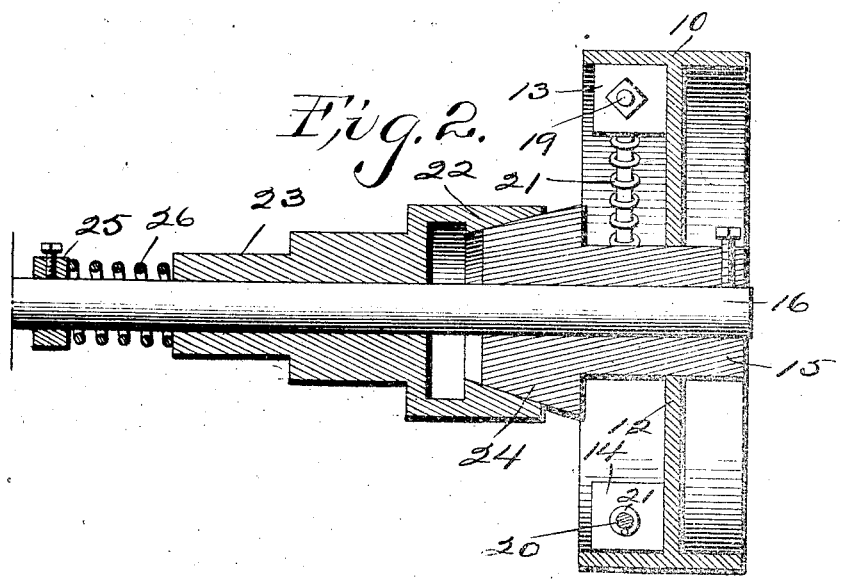

UNITED STATES PATENT OFFICE.

GEORGE DIEHL, OF BAXTER, IOWA.

BAND-WHEEL REGULATOR.

No. 863,055.

Specification of Letters Patent.

Patented Aug. 13, 1907.

Application filed September 3, 1905, Serial No. 277,613. Renewed June 10, 1907. Serial No. 378,286.

*To all whom it may concern:*

Be it known that I, GEORGE DIEHL, a citizen of the United States, residing at Baxter, in the county of Jasper and State of Iowa, have invented a new and useful Band-Wheel Regulator, of which the following is a specification.

My object is to prevent the irregular rotary motion transmitted to a machine by the intermittent explosive force of a gas engine as required to prevent the jarring and concussion incident to motions of machinery not being uniform in speed.

My invention consists in the construction, arrangement and combination of elements and sub-combinations as hereinafter set forth, pointed out in my claims and illustrated in the accompanying drawings, in which:—

Figure 1 is a side view of a flanged band wheel and a loose hub adapted to serve as a member of a friction clutch. Fig. 2 is a transverse sectional view of Fig. 1 and shows the hub fixed to a driving shaft, the band wheel loose on the hub and a spring-actuated clutch member on the shaft and in engagement with the tapering end of the hub that serves as a clutch member.

The numeral 10 is the rim and 12 the web of a wheel that may vary in size as desired. It has lugs 13 and 14 that extend radially inward and they are in alinement with each other.

A hub 15 extends through the aperture in the center of the web 12 of the wheel and has a tapering end adapted to serve as a member of a friction clutch and is fixed on a rotary driving shaft 16 adapted to be connected with a gas engine.

The hub has integral bars 17 and 18 that extend radially and are adjustably connected with the lugs 13 and 14 that project inward from the rim 10 of the band wheel by curved spring supports 19 and 20 that are fixed in apertures in the lugs by nuts on their screw ends as shown in Fig. 1, or in any suitable way. The free ends of spring supports extend through apertures in the bars 17 and 18 and coil springs 21 on the supports are interposed between the lugs on the rim of the wheel and the bars extending from the hub as required to serve as cushions between the hub and the wheel.

A second clutch member 22 on the end of a spring-actuated sleeve 23 placed loosely on the shaft 16 to slide longitudinally thereon engages the cone-shaped clutch member 24 on the end of the hub as required to transfer the intermittent rotary motion of the shaft and the hub to the band wheel to produce a uniform motion of the wheel so that when the band wheel is connected with an extraneous machine, by means of a belt in a common way, to impart uniform motion to the extraneous machine.

A collar 25 is fixed on the shaft 16 and a coil spring 26 interposed between the collar and the end of the sleeve 23 as required to press the clutch members 22 and 24 in engagement.

The sleeve 23 has different diameters adapting it to be used as pulleys in place of the band wheel for transmitting motion from the shaft to extraneous machines at different rates of speed.

It is obvious the spring-actuated friction clutch also aids in maintaining a uniform motion of the band wheel by restricting the irregular motions of the hub and shafts.

It is also obvious the springs carried by the wheel and the spring and sleeve and clutch members slidable on the shaft coact in regulating the speed of the wheel and shaft.

Having thus set forth the purpose of my invention and the construction and function of each element and subcombination the practical operation and utility thereof will be understood by persons familiar with the art to which it pertains.

What I claim as new and desire to secure by Letters-Patent, is:—

1. In a band wheel regulator, a rotatable shaft, a wheel consisting of a rim and a web having an aperture in the center of the web and lugs integral with the rim and web extending radially inwards from the rim and in alinement with each other placed loosely on a hub, a hub provided with bars extending radially and a cone-shaped clutch member integral with the hub fixed on the shaft, curved spring supports fixed to the lugs on the rim and extended through apertures in the bars extended from the hub and coil springs on the spring supports and a mating spring-actuated clutch member placed loosely on the shaft, arranged and combined to operate as set forth.

2. A band wheel regulator comprising a rotatable shaft, a spring-actuated cone-shaped clutch member on the shaft, a wheel hub having an integral mating clutch member at its end and bars extending radially and a band wheel placed loosely on the hub and provided with springs to engage the bars extended from the hub, arranged and combined to operate as set forth.

GEORGE DIEHL.

Witnesses:
PHIL EICH,
CARL C. WEBB.